US008902124B2

(12) United States Patent
Jung et al.

(10) Patent No.: US 8,902,124 B2
(45) Date of Patent: Dec. 2, 2014

(54) DIGITAL IMAGE SIGNAL PROCESSING APPARATUS FOR DISPLAYING DIFFERENT IMAGES RESPECTIVELY ON DISPLAY UNITS AND METHOD OF CONTROLLING THE SAME

(75) Inventors: Dong-jin Jung, Seoul (KR); Dae-jong Noh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 13/013,897

(22) Filed: Jan. 26, 2011

(65) Prior Publication Data

US 2011/0187740 A1 Aug. 4, 2011

(30) Foreign Application Priority Data

Feb. 2, 2010 (KR) ........................ 10-2010-0009670

(51) Int. Cl.
*G09G 5/00* (2006.01)
*G06F 15/16* (2006.01)

(52) U.S. Cl.
CPC ........................................ *G09G 5/00* (2013.01)
USPC ............................................ 345/1.1; 345/502

(58) Field of Classification Search
CPC ....................... G09G 5/00–5/008; G06F 15/16
USPC .................................................. 345/1.1, 502
See application file for complete search history.

(56) References Cited

U.S. PATENT DOCUMENTS

| | | | | |
|---|---|---|---|---|
| 7,698,579 | B2 * | 4/2010 | Hendry et al. | 713/300 |
| 7,995,003 | B1 * | 8/2011 | Diard et al. | 345/1.3 |
| 8,135,441 | B2 * | 3/2012 | Yoon | 455/566 |
| 2008/0204460 | A1 * | 8/2008 | Marinkovic et al. | 345/502 |

* cited by examiner

*Primary Examiner* — Jacinta M Crawford
(74) *Attorney, Agent, or Firm* — Drinker Biddle & Reath LLP

(57) ABSTRACT

A digital image signal processing apparatus includes a digital signal processing unit, a plurality of display units, and a display driving unit. The digital signal processing unit provides a plurality of pieces of image data that respectively form a plurality of images. The plurality of display units display images corresponding respectively to the plurality of pieces of the image data. The display driving unit includes a display memory that records the plurality of pieces of image data, a recording address unit that controls the plurality of pieces of image data to be recorded in the display memory, and a plurality of display address units that respectively read the recorded pieces of image data and provide the recorded pieces of image data respectively to the display units. Accordingly, a photographer may directly display a desired image to a photographed person as a high-quality filtered image without a separate selection operation.

15 Claims, 11 Drawing Sheets

DIGITAL IMAGE SIGNAL PROCESSING APPARATUS FOR DISPLAYING DIFFERENT IMAGES RESPECTIVELY ON DISPLAY UNITS AND METHOD OF CONTROLLING THE SAME

CROSS-REFERENCE TO RELATED PATENT APPLICATION

This application claims the priority benefit of Korean Patent Application No. 10-2010-0009670, filed on Feb. 2, 2010, in the Korean Intellectual Property Office, the disclosure of which is incorporated herein in its entirety by reference.

BACKGROUND

1. Field of the Invention

Embodiments relate to a digital image signal processing apparatus with a plurality of display units and a method of controlling the same.

2. Description of the Related Art

A digital photographing device with dual displays (e.g., a digital camera and a digital camcorder) displays the same image on the dual displays. For example, an image to be captured (e.g., Liveview) or a captured image (e.g., Preview and Playback) is displayed identically on the dual displays. The only difference is that the image displayed on a main Liquid Crystal Display (LCD) viewed by a photographer has a mirror-image relationship with respect to the corresponding image displayed on a sub LCD viewed by an observer (i.e., a photographed person).

SUMMARY

Embodiments include a digital image signal processing apparatus having a plurality of display units and a method of controlling the same, which control the display units to display different images, thus enabling a photographer to selectively display a desired image to a photographed person. Accordingly, the photographer can directly display a desired image to the photographed person without a separate selection operation and the photographed person can enjoy a high-quality filtered image.

According to an embodiment, a digital image signal processing apparatus includes: a digital signal processing unit that provides a plurality of pieces of image data that respectively form a plurality of images; a plurality of display units that display images corresponding respectively to the pieces of the image data; and a display driving unit including a display memory that records the plurality of pieces of image data, a recording address unit that controls the plurality of pieces of image data to be recorded in the display memory, and a plurality of display address units that respectively read the recorded pieces of image data and provide the recorded pieces of image data respectively to the display units.

The digital signal processing unit may provide first image data forming a first image and second image data forming a second image; the display driving unit may include a display memory that records the first image data and the second image data, a recording address unit that controls the first image data and the second image data to be recorded in the display memory, a first display address unit that reads the first image data from the display memory to provide the first image data to a first display unit, and a second display address unit that reads the second image data from the display memory to provide the second image data to a second display unit; and the plurality of display units may include the first display unit that displays the first image and the second display unit that displays the second image.

The first display address unit and the second display address unit may respectively read the first image data to provide the first image data to the first display unit and the second display unit.

The first display address unit may read the first image data and provide the first image data to the first display unit; and the second display address unit may read the second image data that is different from the first image data according to a user's selection and provide the second image data to the second display unit.

The second display address unit may read the second image data from the display memory and provide the second image data to the second display unit; and the first display address unit may read the first image data from the display memory according to a user's selection of the second image corresponding to the second image data displayed on the second display unit and provide the first image data to the first display unit.

When the user does not select the second image displayed on the second display unit, the first display address unit may read the second image data and may not provide the second image data to the first display unit.

The digital image signal processing apparatus may further include a sensor unit that senses the user's selection. The sensor unit may include a gyro sensor unit that senses the user's selection when the user slants the digital image signal processing apparatus.

The first display unit and the second display unit may be disposed respectively on a front side and a rear side of the digital image signal processing apparatus.

The second display unit may include an external display unit.

Another embodiment includes a method of controlling a digital image signal processing apparatus, which includes a digital signal processing unit that provides a plurality of pieces of image data respectively forming a plurality of images, a plurality of display units that display images corresponding respectively to the plurality of pieces of image data, and a display driving unit that includes a display memory that records the image data, a recording address unit that controls the plurality of pieces of image data to be recorded in the display memory, and a plurality of display address units that respectively read the recorded pieces of image data and provide the recorded pieces of image data respectively to the plurality of display units. The method includes: providing, by the digital signal processing unit, the image data respectively forming the images; recording, by the recording address unit, the image data in the display memory; reading, respectively by the plurality of display address units, the image data stored in the display memory and providing the image data respectively to the corresponding display units; and displaying, respectively by the plurality of display units, images corresponding to the received image data.

The digital signal processing unit may sequentially provide the image data respectively forming the images; and the recording address unit may sequentially record the image data in the display memory.

The plurality of display address units may respectively read the image data stored in the display memory and provide the image data respectively to the corresponding display units; and the plurality of display units display the image corresponding to the image data.

The plurality of display address units may respectively read different image data stored in the display memory according to a user's selection and provide the different image data respectively to the corresponding display units; and the plurality of display units may respectively display different images corresponding respectively to the different image data.

The plurality of display address units may include a first display address unit and a second display address unit; the plurality of display units may include a first display unit that receives image data from the display memory by the first display address unit and a second display unit that receives image data from the display memory by the second display address unit; the first display address unit and the second display address unit may read the first image data stored in the display memory according to a user's selection and provide the first image data respectively to the first display unit and the second display unit; and the first display unit and the second display unit may display a first image corresponding to the first image data.

The second display address unit may read second image data from the display memory and provide the second image data to the second display unit; and the first display address unit may read the first image data from the display memory according to a user's selection by a second image corresponding to the second image data displayed on the second display unit and provide the first image data to the first display unit.

When the user does not select the second image displayed on the second display unit, the first display address unit may read the second image data and may not provide the second image data to the first display unit.

After the first image is displayed on the first display unit and the second display unit, the first image may continue to be displayed on the first display unit while the second image is being displayed on the second display unit according to a user's selection.

The digital image signal processing apparatus may further include a sensor unit that senses the user's selection, and the method may further include sensing the user's selection by the sensor unit.

The sensor unit may include a gyro sensor unit that senses the user's selection when the user slants the digital image signal processing apparatus, and the method may further include sensing the user's selection by the gyro sensor unit.

According to another embodiment, a method of controlling a digital image signal processing apparatus which has a first display unit and a second display unit includes: displaying an image on the second display unit; determining whether to select the image displayed on the second display unit; displaying the image on the first display unit if the image is selected; and not displaying the image on the first display unit if the image is not selected.

The digital image signal processing apparatus may further include a gyro sensor unit that senses the slant of the digital image signal processing apparatus, and the method may further include providing a sensing signal from the gyro sensor unit by slanting the digital image signal processing apparatus, wherein the sensing signal may be used to determine whether to select the image displayed on the second display unit.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings.

Figure 1:
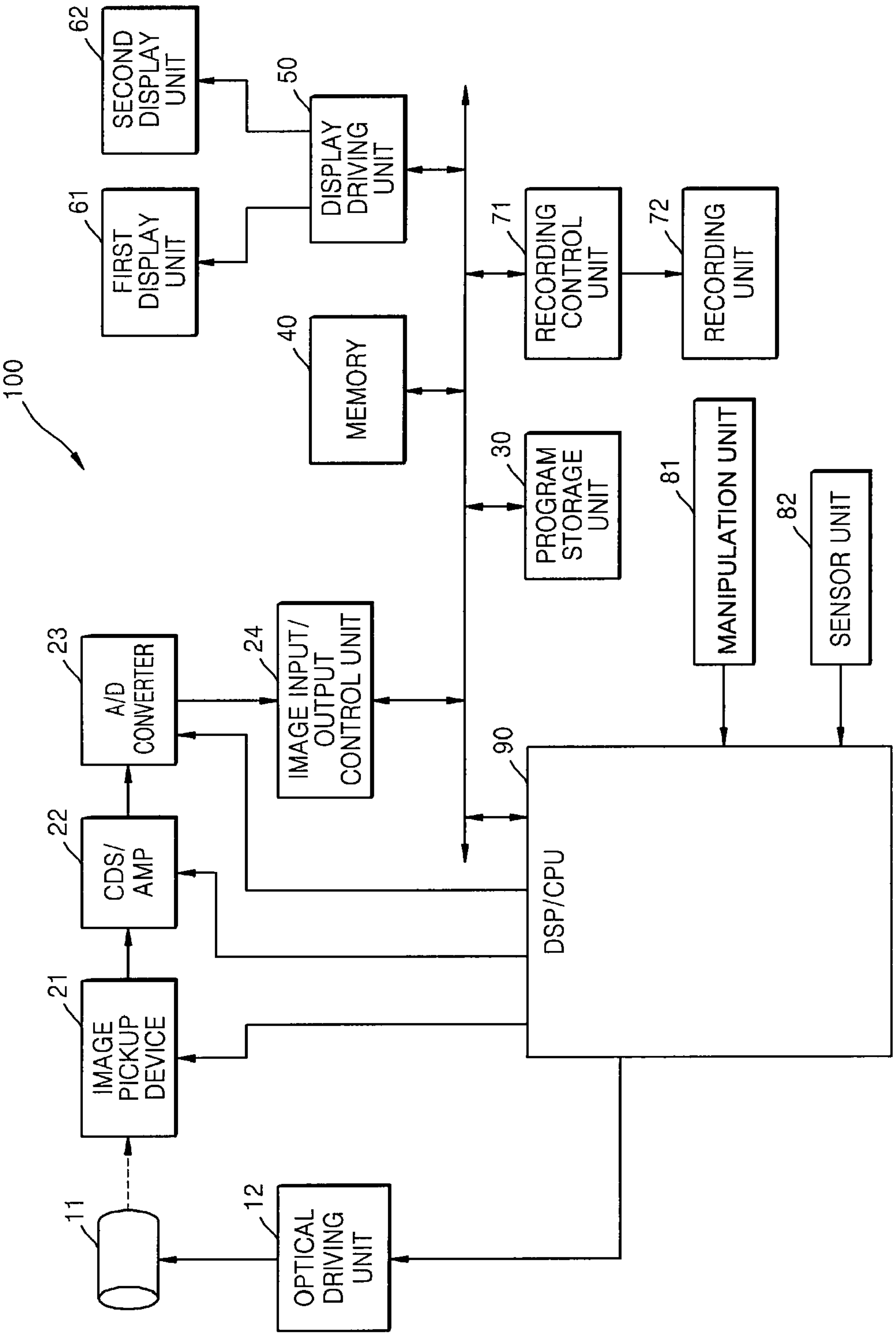
FIG. 1 is a block diagram illustrating a digital camera as an embodiment of a digital image signal processing apparatus, according to an embodiment.

FIG. 1 is a block diagram illustrating a digital camera 100 as an embodiment of a digital image signal processing apparatus, according to an embodiment. In the present embodiment, the digital camera 100 is illustrated as the digital image signal processing apparatus, but this should not be construed as limiting. For example, the digital image signal processing apparatus may also be applicable to various digital devices such as video cameras, Personal Digital Assistants (PDAs), Televisions (TVs), digital photo frames, mobile phones, and Portable Multimedia Players (PMPs).

Referring to FIG. 1, the digital camera 100 includes an optical unit 11, an optical driving unit 12 that drives the optical unit 11, an image pickup device 21, a Correlated Double Sampling/Amplifier (CDS/AMP) 22, an Analog-to-Digital (A/D) converter 23, an image input/output control unit 24, a program storage unit 30, a memory 40, a display driving unit 50, first and second display units 61 and 62 that receive image data from the display driving unit 50, a recording control unit 71, a recording unit 72, a manipulation unit 81, a sensor unit 82, and a Digital Signal Processor/Central Processing Unit (DSP/CPU) 90.

The optical unit 11 may include a lens that condenses an optical signal, a diaphragm that adjusts the size of the optical signal (i.e., the amount of light), and a shutter that controls the input of the optical signal. The lens may include a zoom lens that controls the viewing angle to increase or decrease according to the focal length, and a focus lens that focuses on a subject. Each of the lenses may include a single lens or may include a group of lenses. A shutter may be a mechanical shutter that has shutter plates and that moves up and down. Instead of providing a separate shutter device, the supply of an electrical signal to the image pickup device 21 may be controlled to implement a shutter function.

The optical driving unit 12 that drives the optical unit 11 may control lens positioning, diaphragm opening/closing and shutter operation to perform operations such as auto focusing, automatic exposure control, diaphragm control, zooming, and focusing. The optical driving unit 12 may drive the optical unit 11 according to a control signal received from the DSP/CPU 90.

The image pickup device 21 includes a photoelectric conversion device that receives an optical signal from the optical unit 11 and converts the optical signal into an electrical signal. Examples of the photoelectric conversion device include Charge-Coupled Device (CCD) sensor arrays and Complementary Metal-Oxide Semiconductor (CMOS) sensor arrays. The CDS/AMP 22 eliminates low-frequency noise from an electrical signal output from the CCD while amplifying the electrical signal to a predetermined level. The A/D converter 23 converts an electrical signal, output from the CDS/AMP 22, into a digital signal and outputs the generated digital signal to the image input/output control unit 24.

The image pickup device 21 may be controlled according to a timing signal received from the DSP/CPU 90. A Timing Generator (TG) (not shown) outputs a timing signal to the image pickup device 21 to control a charge readout or an exposure period of each pixel of the photoelectric conversion device. Thus, the image pickup device 21 may provide image data corresponding to a one-frame image according to the timing signal received from the TG.

The program storage unit 30 may store an application program and an Operating System (OS) for operating the digital camera 100. Examples of the program storage unit 30 include electrically erasable programmable read-only memories (E2PROMs), flash memories, and ROMs.

The memory 40 temporarily stores image data of a captured image. The memory 40 may store image data of a plurality of images. The memory 40 sequentially stores an image signal for focus control to output an image signal. The image input/output control unit 24 may control reading/writing an image from/to the memory 40.

The display driving unit 50 drives the first display unit 61 and the second display unit 62 to display various setting images or an image corresponding to captured image data. The image data may correspond to an image recorded in the recording unit 72, or may be received in real time from the memory 40. Examples of the first display unit 61 and the second display unit 62 include liquid crystal displays (LCDs), organic light emitting displays (OLEDs), plasma display panels (PDPs), and electrophoretic displays (EDDs).

The recording control unit 71 controls writing image data to the recording unit 72 and reading setting information or image data recorded in the recording unit 72. Examples of the recording unit 72 include optical disks (e.g., CDs, DVDs, and Blu-ray disks), magneto-optical disks, magnetic disks, and semiconductor memories. The recording unit 72 is used to record captured image data. The recording control unit 71 and the recording unit 72 may be detachably attached to the digital camera 100.

The manipulation unit 81 may include a member for a photographer (or a user) to control the digital camera 100 or perform various settings for photography. For example, the manipulation unit 81 may include buttons, keys, touch panels, or dials. The manipulation unit 81 may be configured to input photographer control signals such as power on/off, photography start/stop, playback start/stop/search, optical system driving, mode conversion, menu control, and selection control. For example, a shutter button may be half-pressed, full-pressed or released by the photographer. The shutter button is half-pressed (S1-controlled) to output a focus control start control signal, and the half pressing is released to terminate the focus control. The shutter button is full-pressed (S2-controlled) to output a photography start control signal. The control signals may be transferred to the DSP/CPU 90 to drive the corresponding components.

The sensor unit 82 may sense the orientation of the digital camera 100. For example, a gyro sensor may be used to sense the slant of the digital camera 100, which may be used to input a selection signal of the user. For example, when the user slants the digital camera 100 to input a selection signal, the gyro sensor may sense the slant to output a sensing signal. The sensing signal may be input to the DSP/CPU 90 to determine the user's selection.

The DSP/CPU 90 may be a program-based operation processor/controller. The DSP/CPU 90 controls an operation of each component of the digital cameral 100. For example, the DSP/CPU 90 outputs a control signal to the optical driving unit 12 on the basis of focus control or exposure control. Also, the DSP/CPU 90 controls each component of the digital camera 100 on the basis of a signal received from the control unit 81. In the present embodiment, the DSP/CPU 90 is illustrated as including one DSP and one CPU, but this should not be construed as limiting. For example, the DSP/CPU 90 may include a plurality of CPUs that respectively execute a command of a signal system and a command of a control system.

The DSP/CPU 90 receives an uncompressed image signal and compresses the uncompressed image signal in a compression format such as a joint photographic experts group (JPEG) compression format or a lempel-ziv-welch (LZW) compression format. Also, the DSP/CPU 90 may reduce the noise of input image data and may perform various image signal processes such as gamma correction, color filter array interpolation, color correction, and color enhancement.

Figure 2:
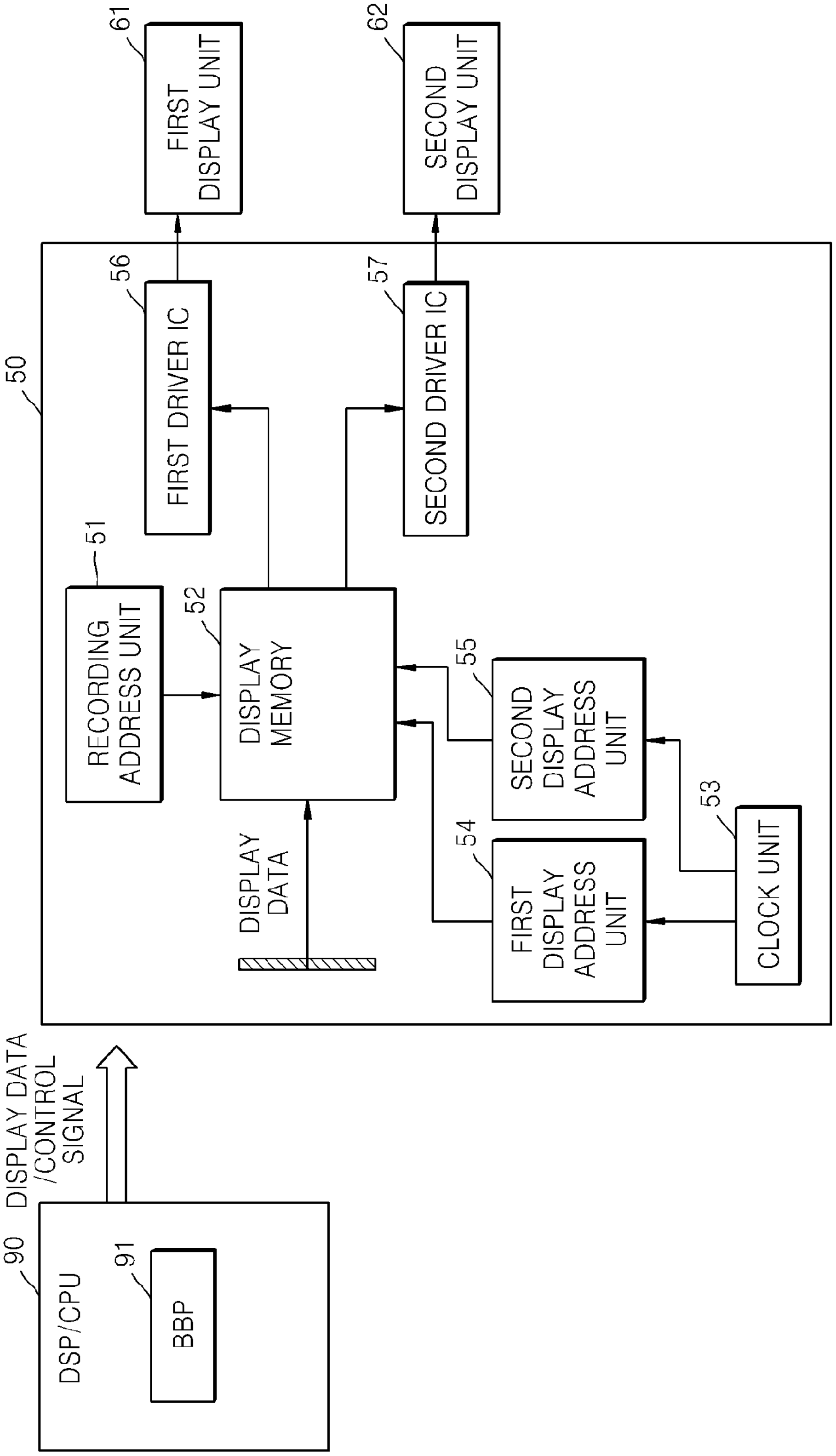
FIG. 2 is a block diagram illustrating a Digital Signal Processor/Central Processing Unit (DSP/CPU), a display driving unit, and first and second display units of FIG. 1, according to an embodiment.

FIG. 2 is a block diagram illustrating the DSP/CPU 90, the display driving unit 50, and the first and second display units 61 and 62 of FIG. 1, according to an embodiment.

Referring to FIG. 2, the DSP/CPU 90 includes a baseband processor (BBP) 91. The BBP 91 performs a digital image signal processing operation and a central processing operation. Display data and a control signal for the implementation of an image are transmitted from the BBP 91 to the display driving unit 50. The display data are recorded in a display memory 52 through an interface. A recording address unit 51 may control the recording operation by control signals such as a Chip Select (CS) signal, a Resister Select (RS) signal, and a Write signal. In a display operation, display data may be read from the display memory 52 according to a display address of a first display address unit 54 or a second display address unit 55. The present embodiment includes a plurality of display units, namely, the first and second display units 61 and 62, and includes a plurality of display address units, namely, the first and second display address units 54 and 55, respectively for the first and second display units 61 and 62 so that different images are displayed respectively on the first and second display units 61 and 62. The display address may be generated in synchronization with a clock signal generated by an internal clock unit 53. The operation according to the internal clock and the providing of the display data/control signal may be performed independently from each other.

The display memory 52 may be a bitmap memory that can record image data corresponding respectively to a plurality of images. A graphic RAM may be used as the display memory 52. Thus, a plurality of images may be stored in the display memory 52, some of the stored images may be selected according to the user's selection, and the selected images may be provided respectively to the first display unit 61 and the second display unit 62. That is, the first display address unit 54 may read image data according to the control signal or the user's selection and provide the read image data through a first driver Integrated Circuit (IC) 56 to the first display unit 61. Likewise, the second display address unit 55 may read image data according to the control signal or the user's selection and provide the read image data through a second driver IC 57 to the second display unit 62.

For example, the first display unit 61 and the second display unit 62 may be displayed respectively on a front side and a rear side of the digital camera 100. Herein, the front side may be the lens mounting side and the rear side may be the side accessed by the photographer (or the user). In a playback mode, when a first image is displayed on the second display unit 62 and the photographer (or the user) views the first image on the second display unit 62 and selects the first image, the first image may be displayed on the first display unit 61. When a second image is displayed on the second display unit 62 and the photographer (or the user) views the second image on the second display unit 62 and does not select the second image, the second image may not be displayed on the first display unit 61. The first display unit 61 may continue to display the first image previously displayed, or may display a default image.

The BBP 91 of the DSP/CPU 90 provides a plurality of pieces of image data that respectively form a plurality of images. The provided pieces of image data are recorded in the display memory 52. Herein, the recording address unit 51 controls the pieces of image data to be recorded in the display memory 52. When the first display address unit 54 reads one of the image data from the display memory 52 and provides the read image data to the first display unit 61, the first display unit 61 displays an image corresponding to the read image data. When the second display address unit 55 reads one or another of the image data from the display memory 52 and provides the read image data to the second display unit 62, the second display unit 62 displays an image corresponding to the read image data.

The recording address unit 51 may sequentially record a plurality of pieces of image data in the display memory 52. For example, the first image data and the second image data may be sequentially recorded in the display memory 52 in the order stated. When the second display address unit 55 reads the first image data to display a first image on the second display unit 62, the photographer (or the user) views the first image. If the photographer (or the user) selects the first image, the first display address unit 54 reads the first image data to display the first image on the first display unit 61. Accordingly, the first display address unit 54 and the second display address unit 55 may read the same first image data and provide the same to the first display unit 61 and the second display unit 62, and the first display unit 61 and the second display unit 62 may display the same first image.

When the second display address unit 55 reads the second image data to display a second image on the second display unit 62, the photographer (or the user) views the second image. If the photographer (or the user) does not select the second image, the first display address unit 54 does not read the second image data and may not display the second image on the first display unit 61. The first display address unit 54 may provide the previously read first image data to the first display unit 61 so that the first display unit 61 may continue to display the first image. Therefore, the first display address unit 54 may read the first image data and provide the same to the first display unit 61, and the first display unit 61 may display the first image. On the other hand, the second display address unit 55 may read the second image data and provide the same to the second display unit 62, and the second display unit 62 may display the second image that is different from the first image. While the second display unit 62 displays the second image, the first display unit 61 may continue to display the first image that is different from and previous to the second image. Alternatively, the first display unit 61 may display a default image.

The selection by the photographer (or the user) may be input through the control unit 81 of FIG. 1. Alternatively, the selection by the photographer (or the user) may be input through the sensor unit 82 (e.g., specifically the gyro sensor) by the slant of the digital camera 100 by the photographer (or the user). An operation of sensing the selection by the photographer (or the user) may be included to determine whether to display an image, which is displayed on the second display unit 62, simultaneously on the first display unit 61. The selection by the photographer (or the user) may be sensed through the manipulation unit 81, or may be sensed through the sensor unit 82 such as a gyro sensor, as described above.

In the present embodiment, the display units are disposed respectively on the front side and the rear side of the digital camera, but this should not be construed as limiting. For example, one of the display units may be used as an external display device. Thus, the photographer (or the user) may view an image displayed on the digital camera and control a desired image to be selectively displayed on the external display device.

Figure 3:
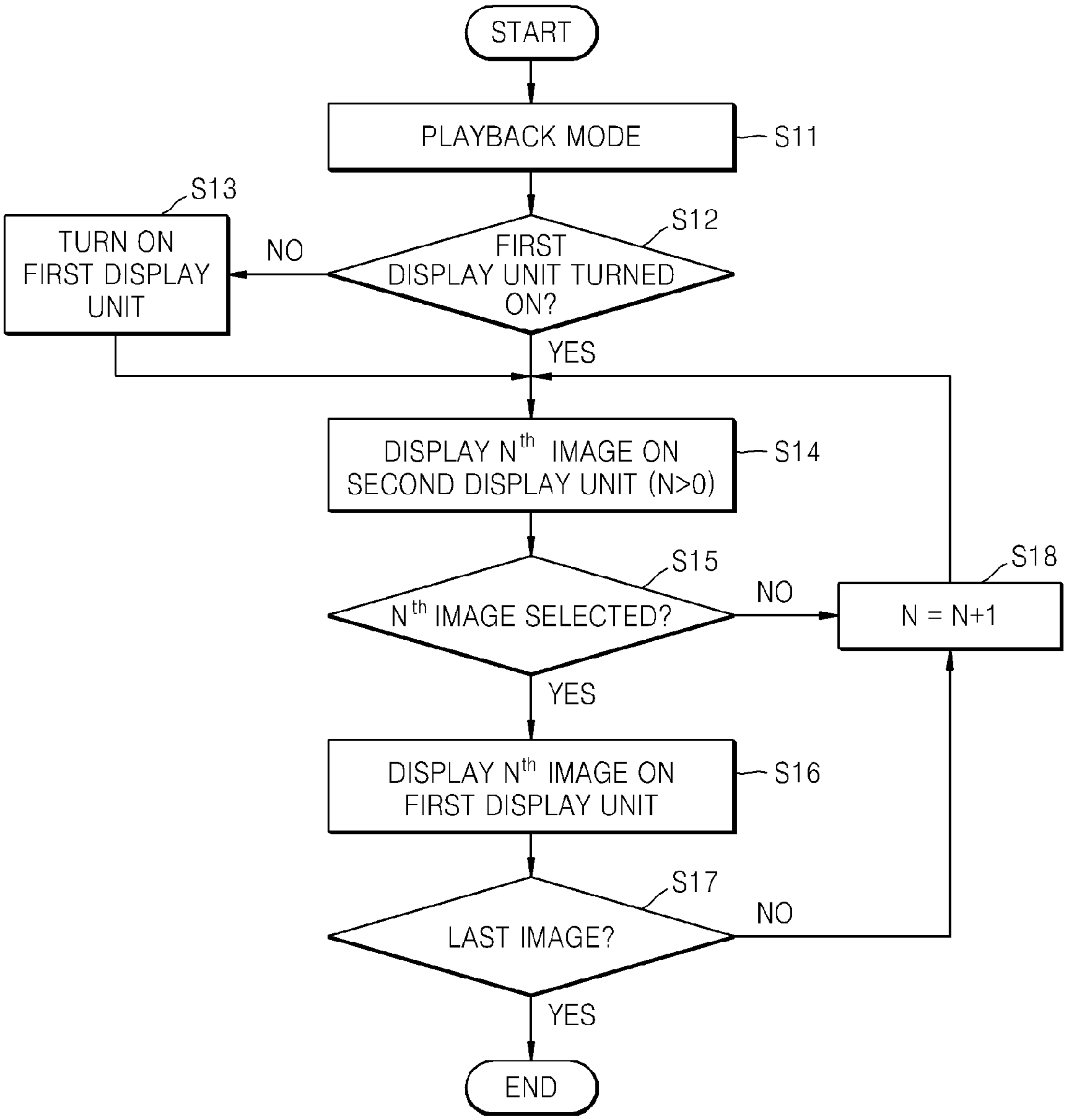
FIG. 3 is a flowchart illustrating a method of controlling a digital image signal processing apparatus, according to an embodiment.

FIG. 3 is a flowchart illustrating method of controlling a digital image signal processing apparatus, according to an embodiment. The method of controlling a digital image signal processing apparatus including a first display unit and a second display unit involves a method of displaying an image on each display unit.

Referring to FIG. 3, a playback mode of the digital image signal processing apparatus is executed (S11).

It is determined whether the first display unit is turned on (S12).

If the first display unit is not in an on state, the first display unit is turned on (S13).

Otherwise, if the first display unit is turned on, or after the first display unit is turned on, the $N^{th}$ image is displayed on the second display unit (S14).

It is determined whether to select the $N^{th}$ image on the second display unit (S15).

If selected, the $N^{th}$ image is displayed on the first display unit (S16).

It is determined whether the current image is the last image (S17). If the current image is the last image, a next image is derived (S18). Thereafter, the above-described operations are repeated from operation S14 to display the next image on the second display unit.

Otherwise, if the $N^{th}$ image is not selected in operation S15, a next image is derived (S18). Thereafter, the above-described operations are repeated from operation S14 to display the next image on the second display unit. Thus, if not selected, the $N^{th}$ image is not displayed on the first display unit. That is, different images may be displayed on the second display unit, which is viewable by the user according to the user's selection, and the first display unit viewable by the observer other than the user.

FIGS. 4 to 8 are diagrams illustrating the display of images on the digital camera 100 as an embodiment of the digital image signal processing apparatus, equipped with a dual LCD and a gyro sensor, according to an embodiment.

Figure 4:
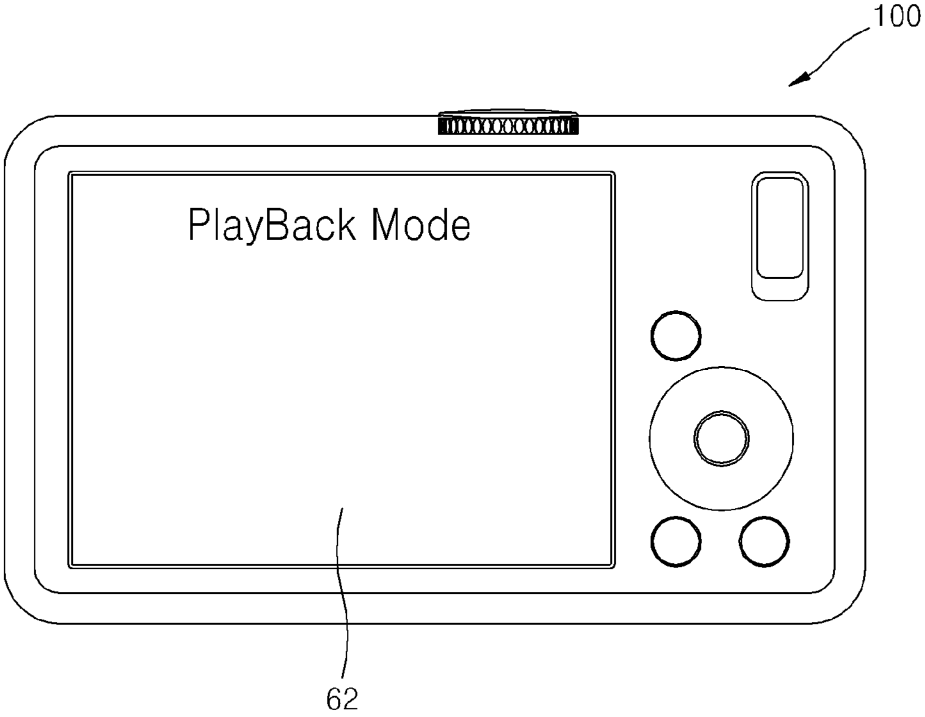
FIGS. 4 to 8 are diagrams illustrating the display of images on a digital camera as an embodiment of a digital image signal processing apparatus, equipped with a dual LCD and a gyro sensor, according to an embodiment.

Referring to FIG. 4, a playback mode is executed in the digital camera 100. The photographer (or the user) can view an image displayed on a rear LCD 62.

Figure 5:
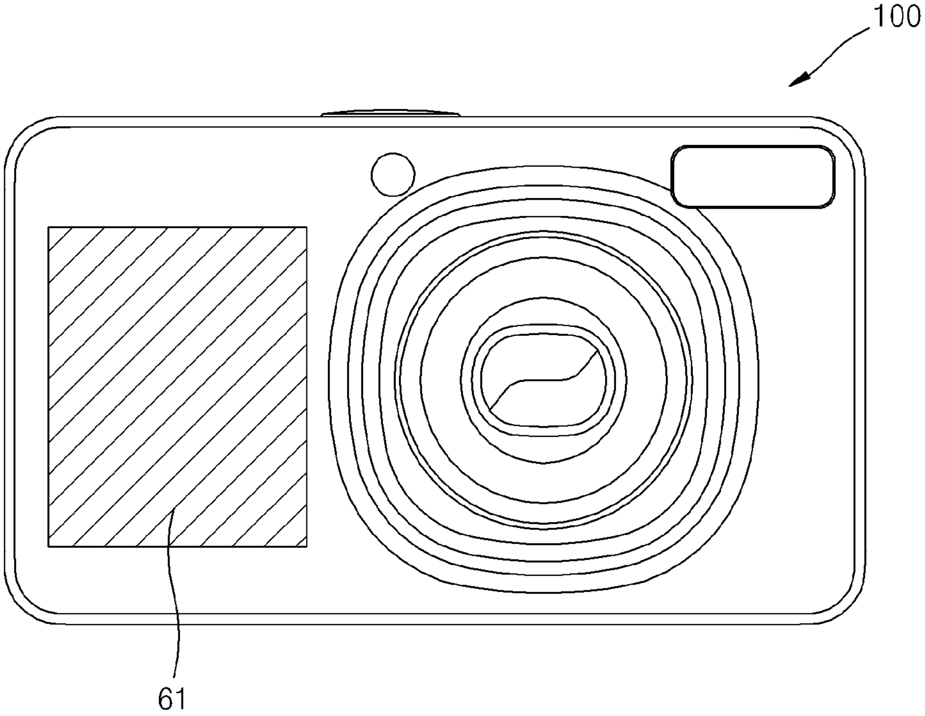

Referring to FIG. 5, the digital camera 100 is provided with a front LCD 61 viewable by the observer. The front LCD 61 may separately turn on/off the display of an image.

Figure 6:
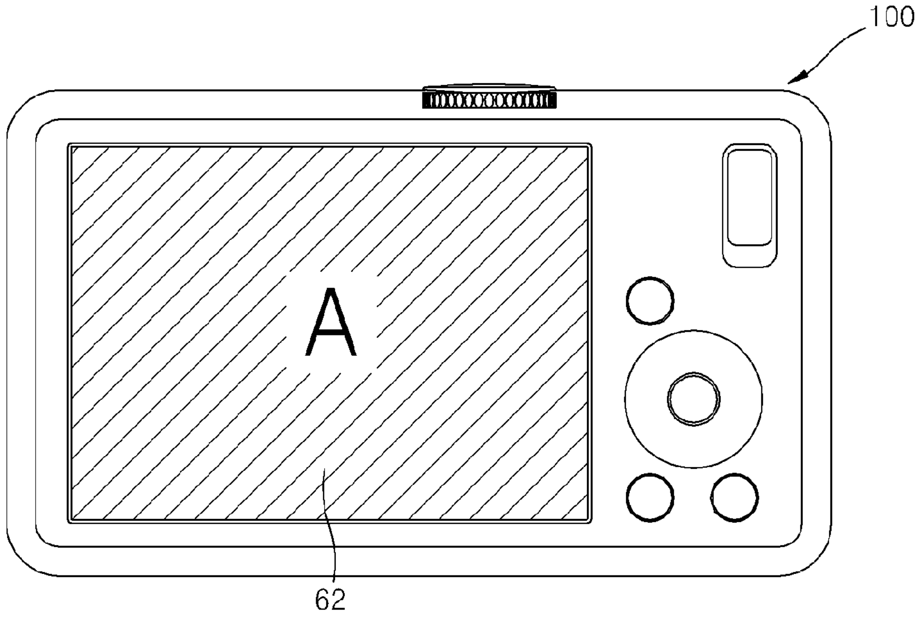

Referring to FIG. 6, while the front LCD 61 is turned on, the $N^{th}$ image 'A' is displayed on the rear LCD 62.

Figure 7:
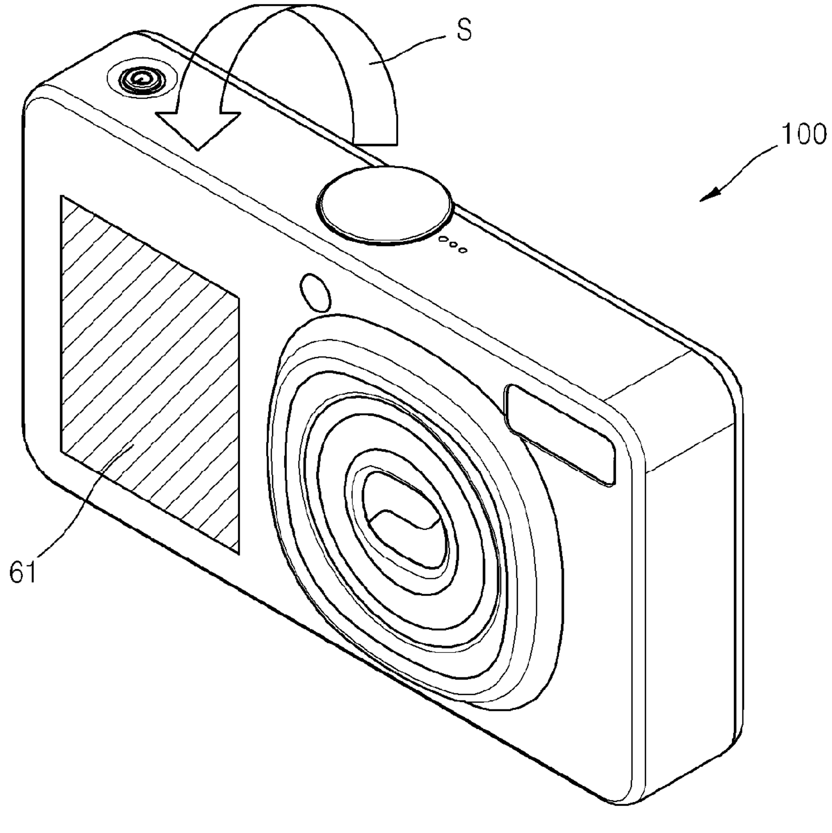

Referring to FIG. 7, when the photographer views the $N^{th}$ image and desires to display the same on the front LCD 61, a selection signal of the photographer is input by slanting (S) the digital camera 100.

Figure 8:
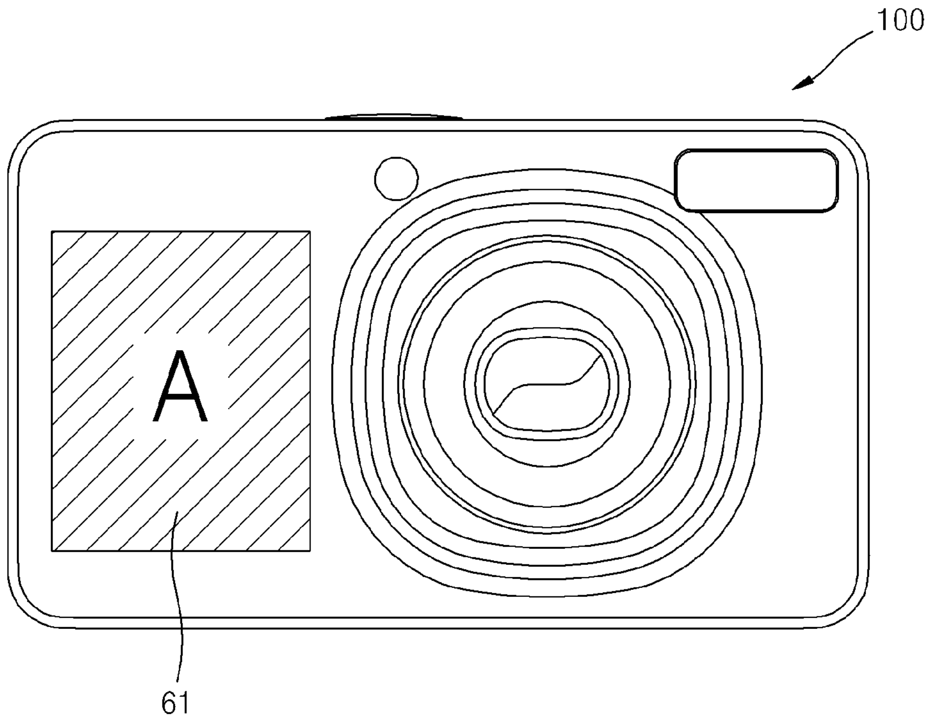

The slanting (S) is sensed by the gyro sensor mounted on the digital camera 100, and the $N^{th}$ image 'A' is displayed on the front LCD 61, as illustrated in FIG. 8. In this manner, the front LCD 61 may display only an image selected by the photographer.

Thus, the embodiment makes it easy for the photographer to selectively display only a desired image to the observer. Therefore, it is not necessary to separately extract only a desired image to be displayed to the photographer, and the desired image can be easily displayed to the photographer without a separate selection operation.

FIGS. 9 to 13 are diagrams illustrating the display of images on the digital camera 100 as another embodiment of a digital image signal processing apparatus, equipped with a dual LCD and a selection button, according to an embodiment. The present embodiment is similar to the embodiment of FIGS. 4 to 8, with the exception that a selection signal of the photographer (or the user) is input not by a gyro sensor but by a selection button.

Figure 9:
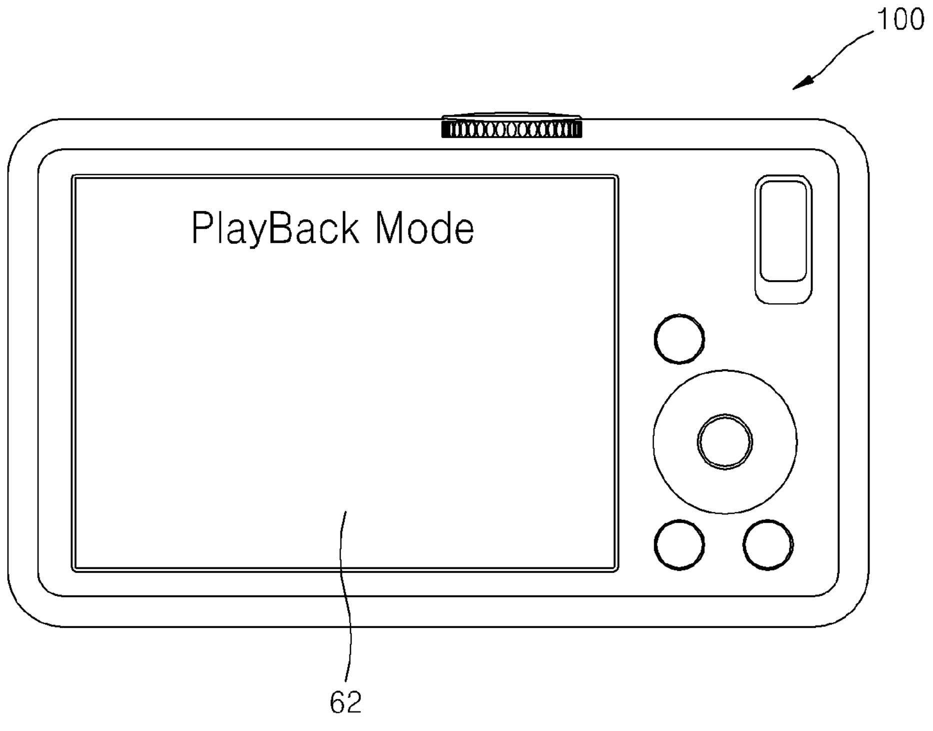
FIGS. 9 to 13 are diagrams illustrating the display of images on the digital camera as another embodiment of a digital image signal processing apparatus, equipped with a dual LCD and a selection button, according to an embodiment.
Figure 10:
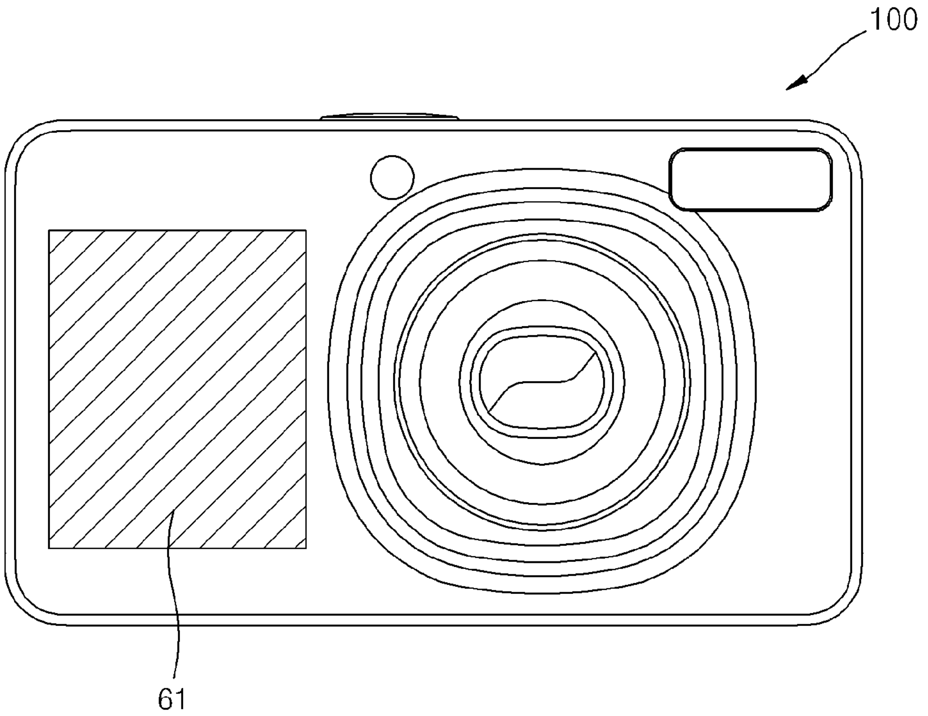
Figure 11:
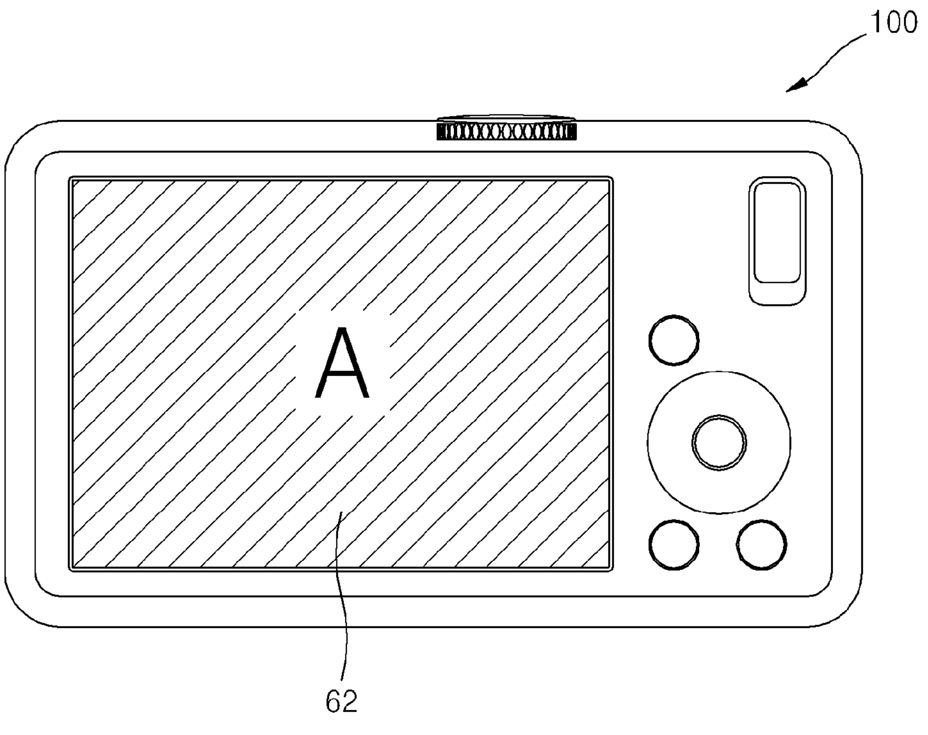
Figure 12:
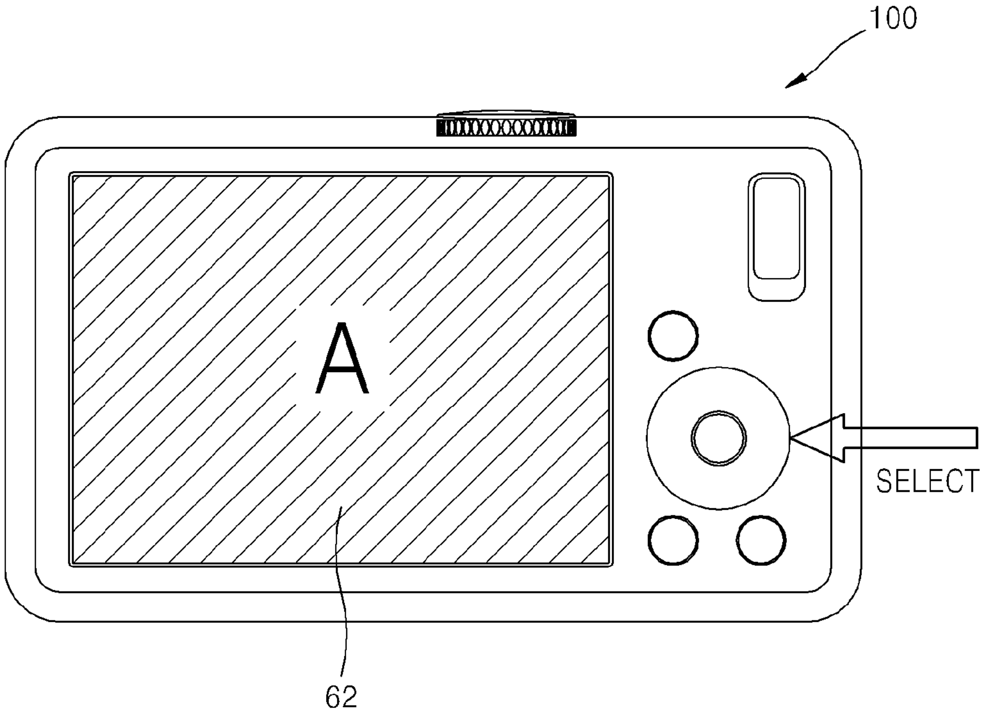
Figure 13:
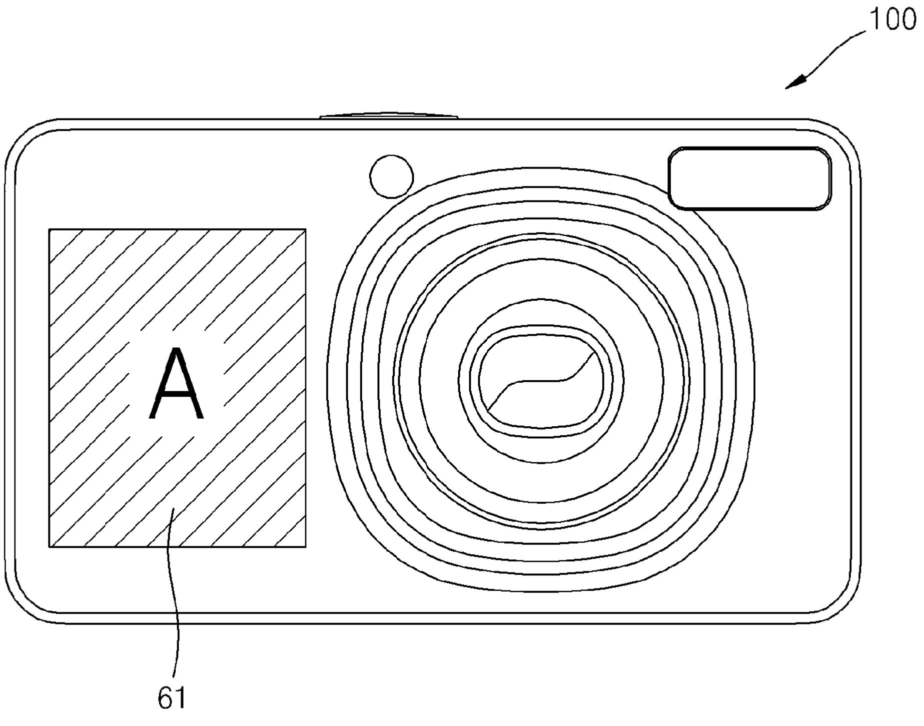
Figure 14:
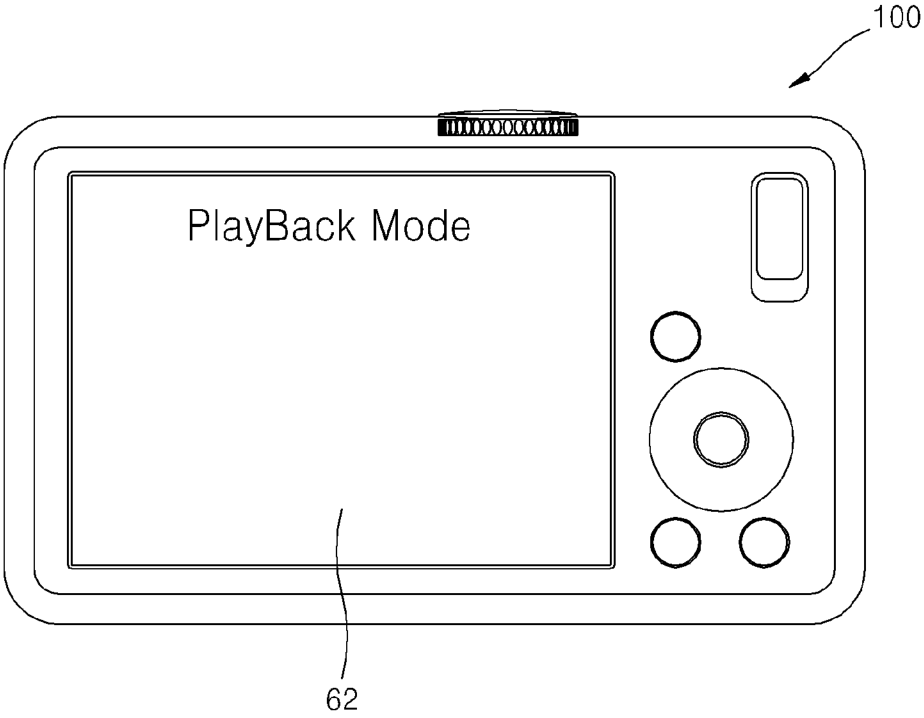
FIGS. 14 to 17 are diagrams illustrating the display of images on an external monitor and an LCD of the digital camera as another embodiment of a digital image signal processing apparatus, according to an embodiment.
Figure 15:
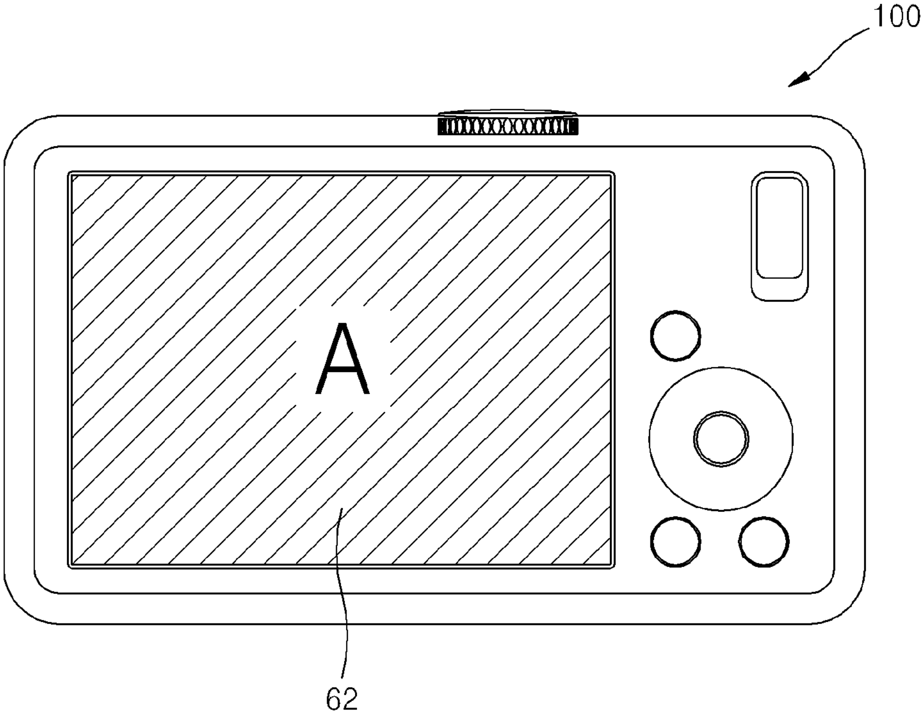
Figure 16:
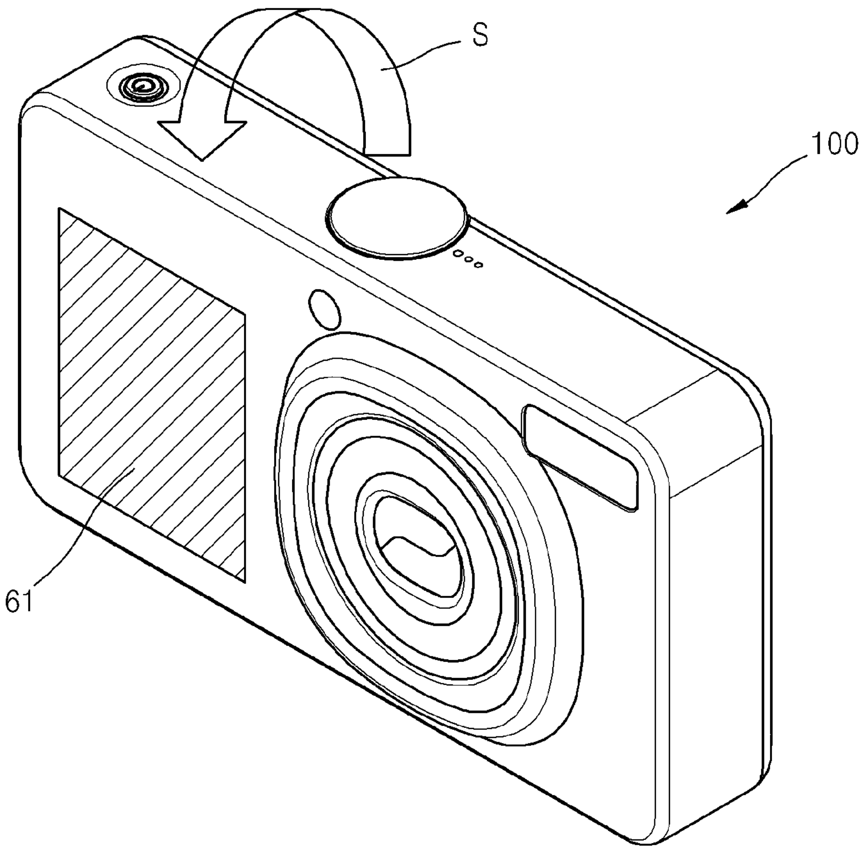
Figure 17:
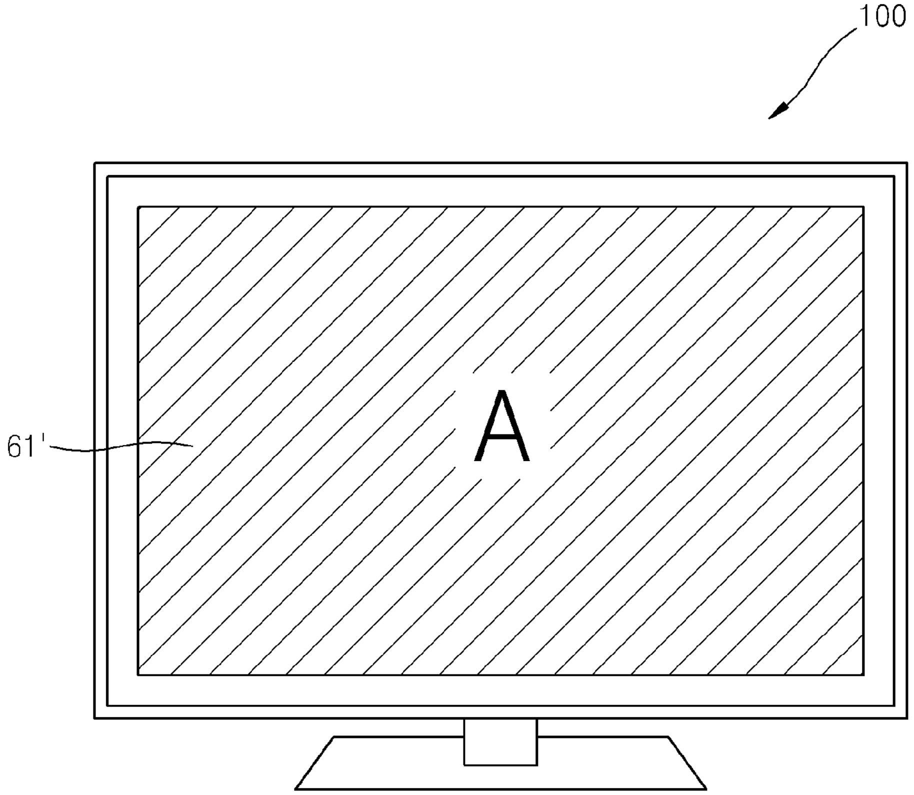

Referring to FIG. 9, a playback mode is executed in the digital camera 100. Referring to FIG. 10, the front LCD 61 of the digital camera 100 may be turned on/off separately. After the front LCD 61 is turned on, the $N^{th}$ image 'A' is displayed on the rear LCD 62, as illustrated in FIG. 11. Referring to FIG. 12, when the photographer views the $N^{th}$ image and desires to display the same on the front LCD 61, the photographer presses a selection button of the digital camera 100 to input a selection signal. Referring to FIG. 13, the $N^{th}$ image 'A' is displayed on the front LCD 61 according to the selection signal. If a selection signal of the photographer is not input, the $N^{th}$ image 'A' is not displayed on the front LCD 61. Accordingly, the observer cannot view the $N^{th}$ image 'A'.

FIGS. 14 to 17 are diagrams illustrating the display of images on an external monitor 61' and an LCD of the digital camera 100 as another embodiment of a digital image signal processing apparatus, according to an embodiment. The digital camera 100 of the present embodiment controls the display of an image on the monitor 61', which is an external display device. The digital camera 100 according to the present embodiment also has a gyro sensor, and the input of a selection signal of the photographer is the same as illustrated in FIGS. 4 to 8. However, when the photographer views the $N^{th}$ image 'A' displayed on the rear LCD 62 of the digital camera 100 and inputs a selection signal, the $N^{th}$ image 'A' may be displayed on the external LCD monitor 61'. The digital camera 100 according to the present embodiment has a front LCD 61, and the front LCD 61 and the external monitor 61' may display the same image.

According to the embodiments described above, the photographer can directly display a desired image to a photographed person without a separate selection operation and the photographed person can enjoy a high-quality filtered image.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein can be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as “essential” or “critical”. It will also be recognized that the terms “comprises,” “comprising,” “includes,” “including,” “has,” and “having,” as used herein, are specifically intended to be read as open-ended terms of art. The use of the terms “a” and “an” and “the” and similar referents in the context of describing the invention (especially in the context of the following claims) are to be construed to cover both the singular and the plural, unless the context clearly indicates otherwise. In addition, it should be understood that although the terms “first,” “second,” etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A digital image signal processing apparatus comprising:

a digital signal processing unit that provides a plurality of pieces of image data that respectively form a plurality of images;

a plurality of display units that display images corresponding respectively to the plurality of pieces of image data;

a display driving unit comprising:

a display memory that records the plurality of pieces of image data, a recording address unit that controls the plurality of pieces of image data to be recorded in the display memory, and a plurality of display address units that respectively read the recorded pieces of image data and provide first image data to a first display unit of the plurality of display units and provide second image data that is different from the first image data to a second display unit of the plurality of display units according to a user’s selection; and a sensor unit that senses the user’s selection, wherein the sensor unit comprises a gyro sensor unit that senses the user’s selection when the user slants the digital image signal processing apparatus.

2. The digital image signal processing apparatus of claim 1, wherein:

the digital signal processing unit provides the first image data forming a first image and the second image data forming a second image;

the display memory records the first image data and the second image data;

the recording address unit controls the first image data and the second image data to be recorded in the display memory;

the plurality of display address units comprise:

a first display address unit that reads the first image data from the display memory to provide the first image data to the first display unit, and a second display address unit that reads the second image data from the display memory to provide the second image data to the second display unit; and the plurality of display units comprise the first display unit that displays the first image and the second display unit that displays the second image.

3. The digital image signal processing apparatus of claim 2, wherein the first display address unit and the second display address unit respectively read the first image data to provide the first image data to the first display unit and the second display unit.

4. The digital image signal processing apparatus of claim 2, wherein:

the second display address unit reads the second image data from the display memory and provides the second image data to the second display unit; and the first display address unit reads the first image data from the display memory according to the user’s selection of the second image corresponding to the second image data displayed on the second display unit and provides the first image data to the first display unit.

5. The digital image signal processing apparatus of claim 4, wherein when the user does not select the second image displayed on the second display unit, the first display address unit reads the second image data and does not provide the second image data to the first display unit.

6. The digital image signal processing apparatus of claim 2, wherein the first display unit and the second display unit are disposed respectively on a front side and a rear side of the digital image signal processing apparatus.

7. The digital image signal processing apparatus of claim 2, wherein the second display unit comprises an external display unit.

8. A method of controlling a digital image signal processing apparatus, which includes a digital signal processing unit that provides a plurality of pieces of image data respectively forming a plurality of images, a plurality of display units that display images corresponding respectively to the plurality of pieces of image data, and a display driving unit that includes a display memory that records the image data, a recording address unit that controls the plurality of pieces of image data to be recorded in the display memory, and a plurality of display address units that respectively read the recorded pieces of image data and provide the recorded pieces of image data respectively to the plurality of display units, the method comprising:

providing, by the digital signal processing unit, the image data respectively forming the plurality of images;

recording, by the recording address unit, the image data in the display memory;

reading, respectively by the plurality of display address units, the image data stored in the display memory and providing the image data respectively to the corresponding display units; and displaying, respectively by the plurality of display units, images corresponding to the received image data;

wherein the plurality of display address units respectively read different image data stored in the display memory according to a user’s selection and provide the different image data respectively to the corresponding display units;

the plurality of display units respectively display different images corresponding respectively to the different image data;

the digital image signal processing apparatus further includes a gyro sensor unit that senses the user’s selection when the user slants the digital image signal processing apparatus; and the method further comprises sensing the user’s selection by the gyro sensor unit.

9. The method of claim 8, wherein:

the digital signal processing unit sequentially provides the image data respectively forming the images; and the recording address unit sequentially records the image data in the display memory.

10. The method of claim 8, wherein:

the plurality of display address units respectively read the image data stored in the display memory and provide the image data respectively to the corresponding display units; and the plurality of display units display the image corresponding to the image data.

11. The method of claim 8, wherein:

the plurality of display address units include a first display address unit and a second display address unit;

the plurality of display units include a first display unit that receives image data from the display memory by the first display address unit and a second display unit that receives image data from the display memory by the second display address unit;

the first display address unit and the second display address unit read the first image data stored in the display memory according to a user's selection and provide the first image data respectively to the first display unit and the second display unit; and the first display unit and the second display unit display a first image corresponding to the first image data.

12. The method of claim 11, wherein the second display address unit reads second image data from the display memory and provides the second image data to the second display unit; and the first display address unit reads the first image data from the display memory according to a user's selection of a second image corresponding to the second image data displayed on the second display unit and provides the first image data to the first display unit.

13. The method of claim 12, wherein when the user does not select the second image displayed on the second display unit, the first display address unit reads the second image data and does not provide the second image data to the first display unit.

14. The method of claim 12, wherein after the first image is displayed on the first display unit and the second display unit, the first image continues to be displayed on the first display unit while the second image is being displayed on the second display unit according to a user's selection.

15. A method of controlling a digital image signal processing apparatus including a first display unit and a second display unit, the method comprising:

displaying an image on the second display unit;

determining whether to select the image displayed on the second display unit;

displaying the image on the first display unit if the image is selected; and not displaying the image on the first display unit if the image is not selected;

wherein the digital image signal processing apparatus further includes a gyro sensor unit that senses the slant of the digital image signal processing apparatus, and the method further comprises providing a sensing signal from the gyro sensor unit by slanting the digital image signal processing apparatus;

wherein the sensing signal is used to determine whether to select the image displayed on the second display unit.

* * * * *